Patent 3,277,325

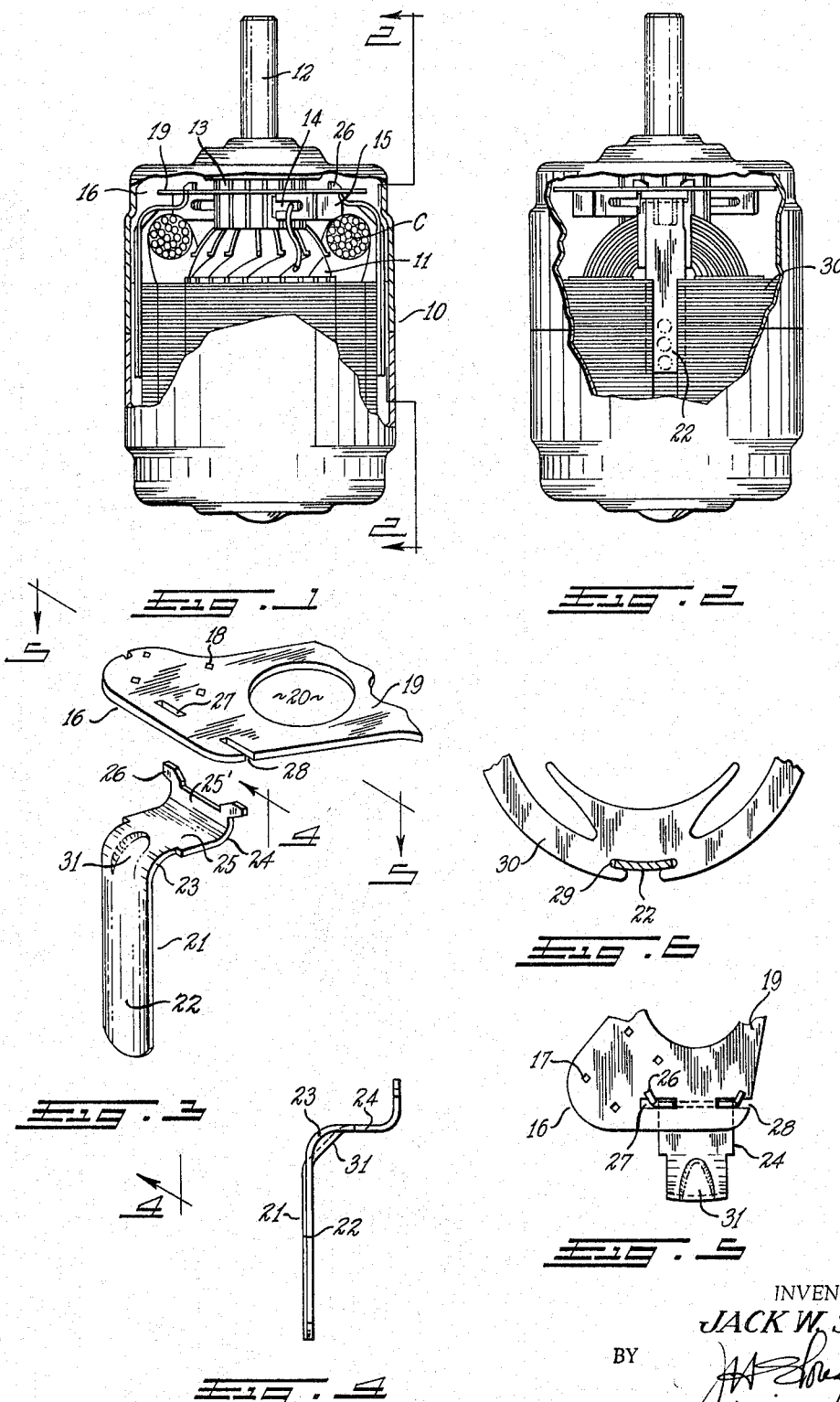

3,277,325
BRUSH HOLDER MECHANISM FOR ELECTRIC MOTOR
Jack W. Staff, Elyria, Ohio, assignor, by mesne assignments, to The G.I. Company, Elyria, Ohio, a corporation of Ohio
Filed Feb. 12, 1964, Ser. No. 344,393
3 Claims. (Cl. 310—239)

My invention relates to improvements in motor brush mountings and relates particularly to that type of mountings particularly adapted for use on smaller fractional horsepower motors, such as are commonly employed to drive automobile heater fans, though not limited thereto.

Among the objects of my invention are to provide brush mountings of the type referred to which will be simple to manufacture, inexpensive, consisting of few parts, easy to assemble, and efficient in use.

Another object of my invention is to provide brush mountings of the type referred to which will securely hold the stator laminations in their stacked relationship and which brush mountings will be securely locked in engagement with the stator thus affording good support for the brush carriers.

Other objects of my invention and the invention itself will be readily apparent from the following specification, descriptive of the invention, which is shown in the accompanying drawings forming a part hereof, in which drawing:

FIG. 1 is a view, partly in diametrical section of a motor, with a part of the casing being removed, showing the improved brush mounting of my invention in its assembled position;

FIG. 2 is a view similar to that of FIG. 2 taken from the plane 2—2 of FIG. 1;

FIG. 3 is an exploded perspective view of portions of the brush mounting of FIGS. 1 and 2;

FIG. 4 is a side view of a part of the brush mounting taken from the plane 4—4 of FIG. 3;

FIG. 5 is a top plan view of the brush mounting separate parts of FIG. 3 in their assembled relation;

FIG. 6 is a top plan view of a stator lamination showing the brush mounting support in section and disposed within the stator slot.

Referring now to the drawings, in all of which like parts are designated by like reference characters, at 10 I show a fractional horsepower motor of conventional type, comprising an armature 11 mounted on a shaft 12 journalled in bearings at the ends of the housing; and a conductive segmented commutator 13 coaxial with the armature and rotatable therewith, which conducts current from the brushes 14 to the coils, shown at "C" of the armature. A pair of brush holders 15 are preferably mounted to the underside of a flat mounting plate 16 preferably formed of fiber, Bakelite or the like, by means of integral lugs 17 which project through a plurality of openings 18 disposed at opposite sides 19 of the plate 15, which sides are generally offset with respect to the body of the plate 16 wherefor the brushes are carried at opposite sides of fixed windings C disposed at either side of the armature. The plate is provided with a central circular bore 20 wherefor the commutator 13 projects therethrough and has clearance therewith. The brush mounting plate 16 is adapted to be securely retained about the commutator and is mounted upon a pair of improved support strips or brackets 21, preferably formed of steel, one being secured at either end thereof, as shown in FIGS. 1, 2 and 5. It is contemplated that such brackets may be formed of brass, aluminum or other suitable material.

Each of the strips or brackets 21 are generally of reverse L-shape and have a generally elongated arcuate (slightly bowed) narrow stem portion 22, an intermediate inwardly curved yoke portion 23, a brush plate securing portion 24 having an intermediate generally flattened portion 25, an upwardly extending recessed portion 25' provided with opposite tangs or ears 26—26. One of the said ears or tangs 26, is, in the form of my invention shown herein, projected through a generally rectangular slot 27 disposed centrally and at an end of the plate 16 and the opposite ear or tang of each strip is projected within an open end slot 28 provided at an edge of the said plate. The ears 26 are preferably bent after insertion within the said slots, best shown in FIG. 5, to secure the strips or brackets 21 to the plate 16. Each of the support brackets 21 has its stem 22 inserted within a generally C-shaped stator slot or passageway 29 provided in the outer periphery of the laminated stator 30. In the form shown, such slots are provided intermediate the stator coil channels of the stator laminations, as best shown in FIG. 6. The strips or brackets 21 are preferably punched to forcibly lock the strips in the stator slots in a predetermined position therewith thus maintaining the plate and brushes in definite positioning. It will be obvious that said brackets may be secured to the stator frame in another manner; as for example, by spot welding, cementing, etc. or the like. The support strips or brackets 21, as illustrated herein, are provided with indentations 31 at their inwardly curved portions 23 to provide additional rigidity.

The brackets 21 when assembled in the stator frame are securely mounted in the stator slots and the lateral edges 32 of the arcuate stems thereof are wedgingly seated within the opposite overlapping ends 29' of the preferably arcuate slots 29. Said brackets are disposed at either side of the said stator, the stems extending generally vertically and at right angles to the portions 24 thereof and to the brush plates 16 disposed in generally parallel spaced plane therewith.

It is to be noted that, as illustrated in FIGS. 1 and 2, the stems 22 of the brackets have a portion disposed within the stator slots and secured therein and that each stem is provided with upwardly extending portions disposed exteriorly of and in spaced relation to the field windings disposed within the coil slots of the armature and the portions 24 of the brackets overlap in spaced relation the said fixed windings wherefor the plate 16 is disposed in spaced relation to the said fixed windings and about the commutator, the brushes 14 carried by the brush carriers 15 projecting from the inner ends of the carriers and preferably spring loaded contacting the current collector member or commutator 13.

While I have described my invention in connection with a preferred embodiment, I am aware that numerous and extensive departures may be made therein, without however departing from the spirit of my invention and the scope of the appended claims.

What I claim is:
1. Brush holder mechanism for electric motors of the type having a commutator at one end of a centrally disposed armature and comprising a field structure enclosing a wound portion of the armature, said mechanism comprising a pair of brush support brackets, a substantially flat brush carrier plate, said brush carrier plate provided with a central aperture through which said commutator is adapted to project and having slots at either end thereof, a pair of brushes carried by said brush carrier plate at either side of its centrally apertured portion and angled with respect to the disposition of said brackets on said brush carrier plate, said brushes extending inwardly of said plate and contacting said commutator, said brackets being provided with a transversely arcuately curved stem, a yoke portion, an upwardly extending portion provided with a pair of tangs adapted to enter the said slots in the brush carrier plate and to secure said brackets to the said plate, the opposite edges of said arcuate stem of each of the brackets being wedgingly and spring pressed into an opposite slot in the outer periphery of the said armature.

2. Brush holder mechanism of the type claimed in claim 1 wherein each of the stems of the brush support brackets for the brush holder mechanism are rigidly secured in a predetermined position in said field armature.

3. Brush mechanism for electric motors of the type having a commutator at one end of a centrally disposed armature and comprising a field structure enclosing a wound portion of the armature, said mechanism comprising a pair of brush support brackets, a substantially flat brush carrier plate, said brush carrier plate provided with a central aperture through which said commutator is adapted to project and having slots at either end thereof, a pair of brushes carried by said brush carrier plate at either side of its centrally apertured portion and angled with respect to the disposition of said brackets on said brush carrier plate, said brushes extending inwardly of said plate and contacting said commutator, said brackets being provided with a transversely arcuately curved stem, a yoke portion, an upwardly extending portion provided with a pair of tangs adapted to enter the said slots in the brush carrier plate and to secure said brackets to the said plate, the opposite edges of said arcuate stem of each of the brackets being wedgingly and spring pressed into the ends of an opposite C-shaped slot in the outer periphery of the said armature.

References Cited by the Examiner
UNITED STATES PATENTS

| | | | |
|---|---|---|---|
| 2,629,061 | 2/1953 | Swarthout | 310—239 X |
| 2,780,744 | 2/1957 | Carneck | 310—239 |
| 3,138,728 | 6/1964 | Videtic | 310—239 |

MILTON O. HIRSHFIELD, *Primary Examiner.*

D. F. DUGGAN, *Assistant Examiner.*